United States Patent [19]

Koppa

[11] 4,024,802
[45] May 24, 1977

[54] HYDRAULIC PISTON AND ROD ASSEMBLY

[75] Inventor: James A. Koppa, Antioch, Ill.

[73] Assignee: International Harvester Company, Chicago, Ill.

[22] Filed: Nov. 6, 1975

[21] Appl. No.: 629,815

[52] U.S. Cl. .................................. 92/255; 403/261
[51] Int. Cl.² ........................................ F16J 1/12
[58] Field of Search ............ 92/249, 255, 251, 252; 403/261, 326, 361

[56] References Cited

UNITED STATES PATENTS

| 2,219,385 | 10/1940 | Ernst | 403/361 X |
| 2,388,422 | 11/1945 | Krastel | 92/249 |
| 2,516,472 | 7/1950 | MacKeage | 403/361 X |
| 2,979,903 | 4/1961 | Beck | 92/255 X |
| 3,055,719 | 9/1962 | Kampert | 92/252 |
| 3,426,656 | 2/1969 | Bimba | 92/255 |
| 3,426,657 | 2/1969 | Bimba | 92/255 |
| 3,807,285 | 4/1974 | Phillips | 92/255 |

FOREIGN PATENTS OR APPLICATIONS 1,208,786  9/1959  France ................. 92/251

Primary Examiner—Irwin C. Cohen
Attorney, Agent, or Firm—Douglas W. Rudy; Floyd B. Harman

[57] ABSTRACT

A fluid cylinder, piston and rod assembly where the cylinder is equipped with mounting means and the piston and rod are slidably carried in the cylinder. The piston rod is attached to the piston by means of a segmented locking ring engaging a groove at the piston end of the rod. The locking ring is fastened to the piston by means of a plurality of fasteners.

The piston is equipped with peripheral wear inserts and hydraulic fluid seal means.

2 Claims, 3 Drawing Figures

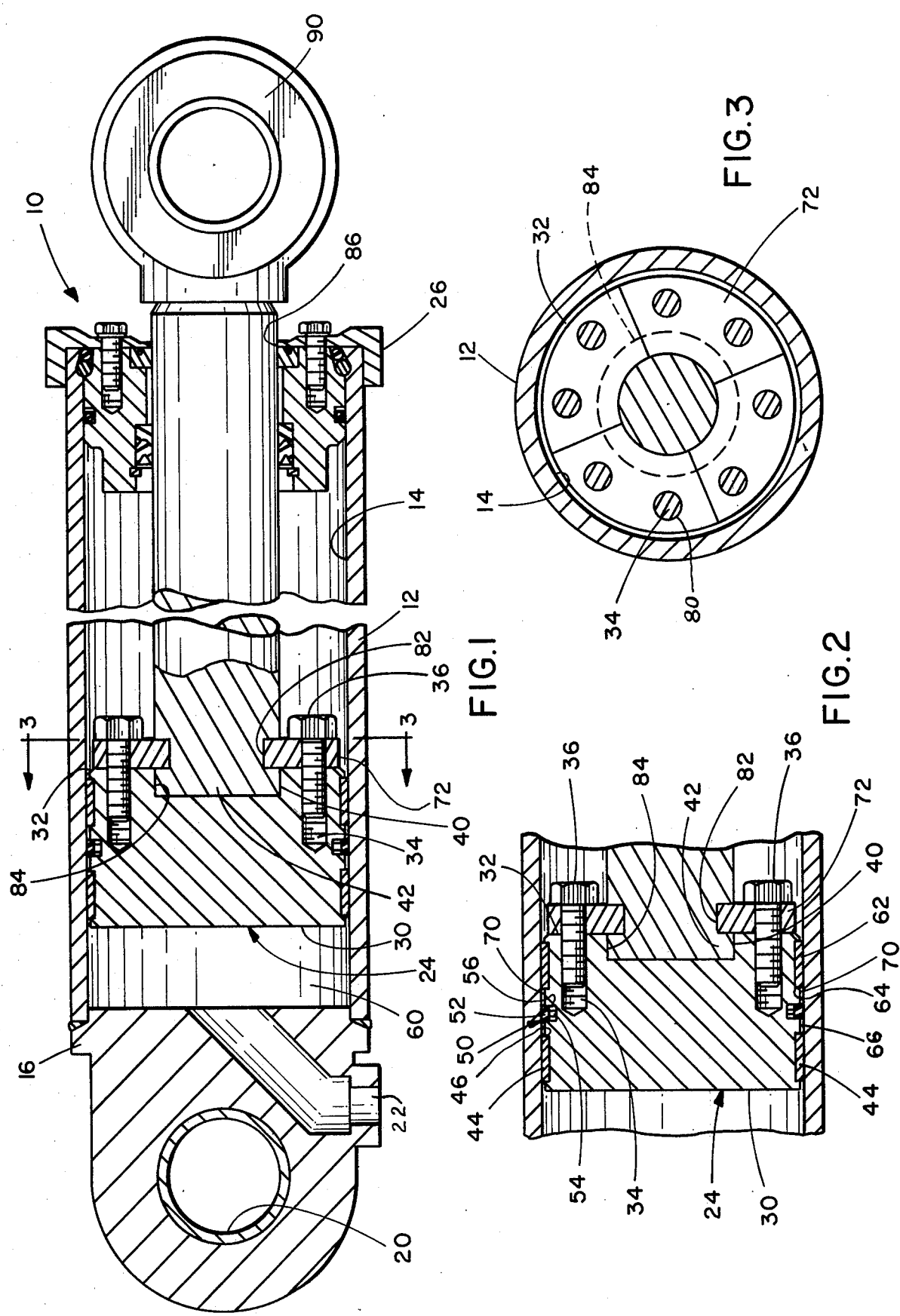

HYDRAULIC PISTON AND ROD ASSEMBLY

BACKGROUND OF THE INVENTION

Field of the Invention

This invention relates to hydraulic cylinder and piston assemblies. More specifically this invention is concerned with the attachment of a piston to a piston rod, the design of the piston and the apparatus used to provide a seal between the walls of the hydraulic cylinder and the piston.

Description of the Prior Art

The usual method of attaching a piston rod to a piston is through the use of a piston pin. The piston pin allows the piston to maintain alignment in the cylinder bore while allowing partial angular displacement of the piston rod.

In hydraulic cylinders piston pin attaching methods are seldom seen. Hydraulic piston and rod assemblies are generally mounted such that the cylinder is pivotally mounted to a frame and the exterior end of the piston rod is pivotally mounted to a reactive member. Therefore it is not essential that the piston be pivotally mounted to the piston rod. This being the case several alternative piston to rod attaching means have been developed.

In hydraulic units it is common to have the inboard end of the piston rod threaded to receive either the piston itself, which would be internally threaded, or a nut positioned after the positioning of the piston on the rod.

Attachment by this method is usually used for pistons having diameters up to about 4 inches. Cylinders and the matching pistons above a certain diameter may require an alternative attachment means as the torque necessary to assure the attachment of the piston to the piston rod is so high that assembly becomes difficult.

One alternative method of attaching a piston to a piston rod is to use a split ring and a two part piston. In a typical embodiment of this type the piston rod will have a major groove as well as a plurality of minor grooves machined onto the inboard end thereof. The major groove is for receiving a segmented locking ring and the minor grooves provide recesses to accommodate seals.

The two part piston assembly comprises a first piston part equipped with a plurality of threaded apertures and a second piston part having an identical number of smooth bore apertures. The first part of the piston is positioned on the piston rod then the locking ring is positioned such that it resides in the major groove of the piston rod. The second part of the piston is positioned on the piston rod and attaching bolts are passed through the apertures of the second part of the piston, the apertures of the split ring and into the threaded apertures of the first part of the piston. When the attaching bolts are torqued down the piston, now a three part assembly, is held fast to the piston rod by the locking ring.

The number of attaching bolts may be varied according to the capacity of the hydraulic cylinder. Generally larger piston to rod assemblies have more (and larger) attaching bolts then smaller assemblies.

Prior art two part piston assemblies may be equipped with a wear ring on each piston part as well as a seal on the cylinder engaging face of each piston part. In addition other seals on the inner rod engaging bore of each piston part are needed to limit fluid flow between the piston and the rod. These inner seals, which attempt to block flow or leakage between the piston and the rod present sealing problems that are difficult to overcome in high capacity hydraulic cylinders.

The cost of the previously discussed piston to rod assembly is high due to the necessity of extensive machining for piston rod seals and the length and subsequent diameter of the attachment bolts.

SUMMARY OF THE INVENTION

The present invention provides a piston to piston rod assembly for use with hydraulic cylinders. A piston is equipped with a counterboard base portion for receiving the inboard end of the piston rod of the hydraulic cylinder. The inboard end of the piston rod has a recess formed therein for receiving a segmented locking ring.

In addition to the blind bore in the base of the piston, the piston is further drilled and tapped for accommodating a plurality of attaching bolts. The segmented locking ring is also drilled to allow passage of the attaching bolts. The piston is attached to the piston rod by means of the locking ring engaging the piston rod recess and being retained by the attaching bolts.

The piston may be equipped with wear surfaces and a seal as necessary.

It is an object of this invention to provide a piston to a piston rod attaching means that does not require a two part piston. Further it is an object to provide a piston and rod assembly that does not allow fluid leakage between the piston and the rod.

It is also an object to eliminate the need for seals between the piston and the piston rod.

Another object of the invention is to reduce the cost of the means to attach a hydraulic piston to a piston rod as well as reduce the number of components to ensure a good seal and cylinder performance.

A further object is to provide a piston to rod assembly that is easier to assemble than the known prior art assemblies.

BRIEF DESCRIPTION OF THE DRAWINGS

The aforesaid and other advantages and objects of the invention will be implied and specifically pointed out in the following descriptions in which:

FIG. 1 presents a sectioned view of a complete hydraulic cylinder including the piston and the piston rod;

FIG. 2 presents a sectioned view of the piston to piston rod attachment means; and FIG. 3 is a top view of the piston to rod attaching means through section 3—3 of FIG. 1.

DETAILED DESCRIPTION OF THE DRAWINGS

Turning now to the figures the invention may be seen in various projections. FIG. 1 presents a hydraulic cylinder generally 10 having a cylindrical body portion 12 having a machined inner surface 14. The cylinder is closed at one end by the end cap 16 securely mounted in a leak proof manner to the cylinder 12. The end cap may also be equipped with a mounting means such as eyelet 20.

An inlet port 22 may also be provided in the cylinder 12 to allow the passage of fluid into the cylinder between the end cap 16 and the piston shown generally as 24.

The other end of the cylinder is also equipped with an apertured end cap 26 securely mounted in a leak proof manner to the cylinder 12.

The piston, generally 24, has a face portion or a top portion 30 and a bottom or rod attachment portion 32 which presents a flat surface as shown in FIGS. 1 and 2, this surface is equipped with a plurality of tapped or threaded apertures 34 for retaining attaching bolts 36. The bottom portion 32 of the piston is further equipped with a centralized blind bore 40 for accommodating the inboard end of a piston rod 42.

FIG. 2 clearly shows the piston with the top 30 and bottom 32 portions, the threaded apertures 34, the blind bore 40, as well as further piston details. A first wear ring 44 is circumferentially disposed in a first circumferential groove 46 in the upper portion of the piston. A seal 50 having an elastomer portion 52 and a backing ring 54 is circumferentially disposed around the piston in a second circumferential groove 56. This seal aids in preventing the passage of fluid from the fluid chamber 60 past the piston.

A second wear ring 62 is circumferentially disposed in the third circumferential groove 64 on the opposite side of the seal 50 from the first wear ring 44. The second wear ring is close to the bottom portion 32 of the piston.

The wear rings are composed of an alloy-metallic composition that is compatible with the machined inner surface 14 of the cylinder 12. The wear rings prevent the piston from becoming cocked in the cylinder while also doing much to prevent the passage of hydraulic fluid from the fluid chamber 60 past the piston.

Note that there is a first piston land 66 between the first circumferential groove 46 and the second circumferential groove 56 as well as a second piston land 70 between the second circumferential groove 56 and the third circumferential groove 64.

The wear rings project past the outside diameter of the piston by a slight amount (e.g. on the order of 0.034 inches to 0.042 inches overall on a piston used in a 7 inch diameter cylinder) to allow for wear and ensure that the piston body does not come in contact with the cylinder inner surface 14.

The seal 50 is constructed such that the elastomer portion 52 thereof will always be biased against the cylinder inner surface 14 by the backing ring 54.

Shown in all the figures and specifically FIGS. 2 and 3 is a segmented locking ring 72. The locking ring may be composed of a plurality of segments and for this embodiment a ring having four segments is shown. The segmented locking ring is an integral component of the piston to rod assembly. The ring is equipped with a plurality of apertures 80 to allow the passage of the attaching bolts therethrough. FIGS. 1 and 2 show that the segmented locking ring 72 is rectangular in cross section.

In FIG. 3 the locking ring is held in position by eight attaching bolts 36 (bolts sectioned) to the flat bottom portion of the piston. The rectangular cross sectioned shape of the locking ring (FIG. 2) presents a flat surface that is held in a distortion free arrangement to the flat bottom portion 32 of the piston when the attaching bolts 36 are torqued down. It should be noted that the number of locking ring segments and attaching bolts used for any particular size cylinder may be varied according to design, strength, and performance criteria.

The locking ring is positioned to interface with the circumferential recess formed in the inboard end of the piston rod 42. The circumferential recess must be formed such that the innermost land portion 84 of the piston rod corresponds with the depth of the blind bore 40 from the bottom 32 of the piston. The diameter of the blind bore 40 is also virtually of the same dimension as the diameter of the inboard end of the piston rod 42. The locking ring 54 thickness corresponds with the width of the circumferential recess 82 in the inboard end of the piston rod 42.

The piston rod may project through the aperture 86 of the end cap and be equipped with attaching means 90 for anchoring the piston rod to a reactive member (not shown).

The piston and the piston rod are attached to each other in the following manner. The piston is placed on the piston rod such that the rod projects into the base of the piston. The segments of the locking ring are fitted into the circumferential groove such that the ring fully encircles the inboard end of the piston rod and the apertures in the locking ring line up with the threaded or tapped apertures in the piston. The attaching bolts are then located through the locking ring and threaded into the piston. Once the bolts are torqued appropriately the piston is securely fastened to the piston rod. The piston and piston rod are positioned into the hydraulic cylinder in a conventional manner.

A second port similar to the first inlet port 22 may be located in the cylinder body if the hydraulic cylinder is to be of the double acting type such that the piston may react to pressure on either the face 30 or the bottom 32 thereof.

An alternative embodiment would have the inlet port and a second port acting as an exhaust port available in proximity to the end cap 16 of the cylinder 12.

Thus it is apparent that there has been provided in accordance with the invention a hydraulic piston and rod assembly that fully satisfies the objects of the invention as previously set out. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A piston and rod assembly for use in a hydraulic cylinder comprising:
   a piston rod having a circumferential recess spaced from one end thereof
   said recess having a first flat wall adjacent said one end and said piston rod one end having a flat surface
   a piston having a plurality of threaded apertures and a blind bore recess with a flat base in an external flat bottom portion of said piston extending partway through the piston for receiving said piston rod with said flat surface of said one end of said piston rod abutting the flat base of said blind bore recess p1 the dimensions of said blind bore recess being virtually the same as the dimensions of said piston rod one end
   a segmented locking ring of rectangular cross section, having a plurality of apertures therethrough, positioned in the circumferential recess of said piston rod;
   said locking ring having dimensions virtually the same as the dimensions of said circumferential recess and further having a first flat surface portion thereon;

a plurality of attaching bolts which pass through the apertures of said segmented locking ring into the threaded apertures of said piston whereby said first flat surface portion of said segmented locking ring is held in direct abutment with said flat bottom portion of said piston and said first flat wall of said circumferential recess.

2. A piston and rod assembly in accordance with claim 1 wherein said piston is a one part cylindrical piston.

* * * * *